No. 736,276. PATENTED AUG. 11, 1903.
N. LOMBARD.
GOVERNOR.
APPLICATION FILED AUG. 11, 1902.
NO MODEL. 7 SHEETS—SHEET 1.

Witnesses:
N. P. Lombard
Nathan C. Lombard 2nd

Inventor.
Nathaniel Lombard,
by Lombard & Cobb
Attys.

No. 736,276. PATENTED AUG. 11, 1903.
N. LOMBARD.
GOVERNOR.
APPLICATION FILED AUG. 11, 1902.
NO MODEL. 7 SHEETS—SHEET 2.

Witnesses:
N. P. Lombard
Nathan C. Lombard 2nd

Inventor:
Nathaniel Lombard,
by Lombard & Cobb
Attys.

No. 736,276. PATENTED AUG. 11, 1903.
N. LOMBARD.
GOVERNOR.
APPLICATION FILED AUG. 11, 1902.
NO MODEL. 7 SHEETS—SHEET 3.

Witnesses:
N. P. Lombard
Nathan C. Lombard 2nd

Inventor:
Nathaniel Lombard,
by Lombard & Cobb
Attys.

No. 736,276. PATENTED AUG. 11, 1903.
N. LOMBARD.
GOVERNOR.
APPLICATION FILED AUG. 11, 1902.
NO MODEL. 7 SHEETS—SHEET 4.

Witnesses: Inventor:
N. P. Lombard Nathaniel Lombard,
Nathan C. Lombard 2nd by Lombard & Cobb
Attys.

No. 736,276. PATENTED AUG. 11, 1903.
N. LOMBARD.
GOVERNOR.
APPLICATION FILED AUG. 11, 1902.
NO MODEL. 7 SHEETS—SHEET 5.

Witnesses:
N. P. Lombard
Nathan C. Lombard 2nd

Inventor:
Nathaniel Lombard,
by Lombard & Cobb
Attys.

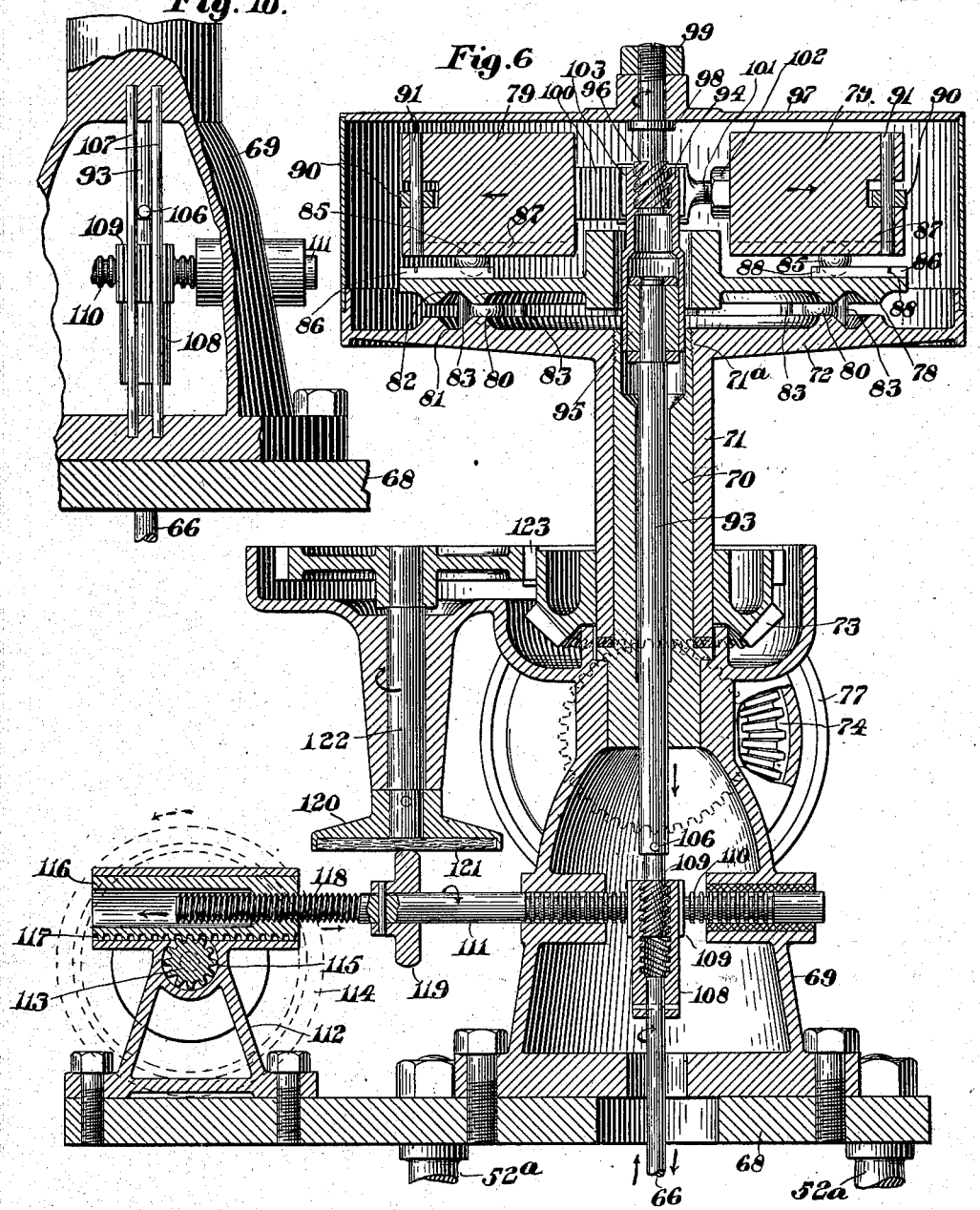

No. 736,276. PATENTED AUG. 11, 1903.
N. LOMBARD.
GOVERNOR.
APPLICATION FILED AUG. 11, 1902.
NO MODEL. 7 SHEETS—SHEET 7.
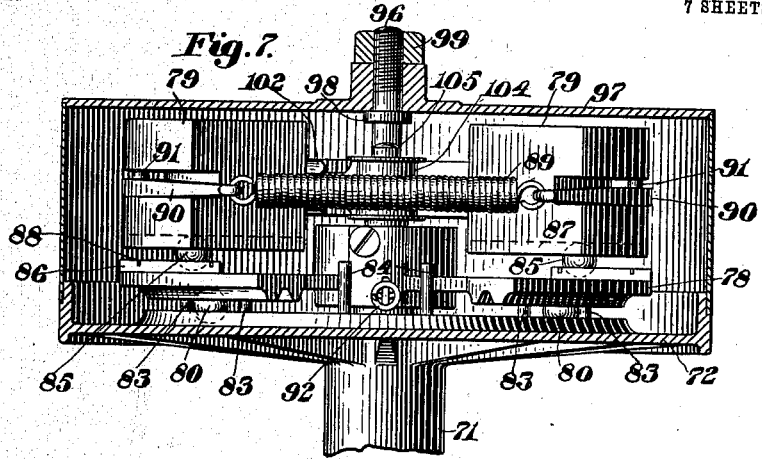
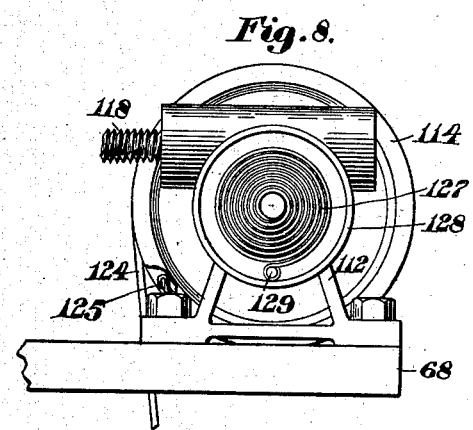
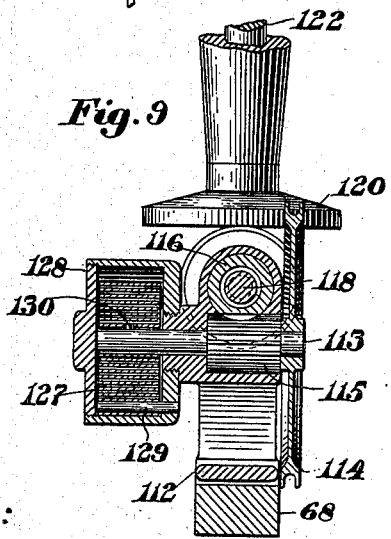
Witnesses:
N. P. Lombard
Nathan C. Lombard 2nd
Inventor:
Nathaniel Lombard
by Lombard & Cobb
Attys:

No. 736,276. Patented August 11, 1903.

UNITED STATES PATENT OFFICE.

NATHANIEL LOMBARD, OF BROOKLINE, MASSACHUSETTS, ASSIGNOR TO THE N. LOMBARD IMPROVED GOVERNOR COMPANY, OF BOSTON, MASSACHUSETTS, A CORPORATION OF MAINE.

GOVERNOR.

SPECIFICATION forming part of Letters Patent No. 736,276, dated August 11, 1903.

Application filed August 11, 1902. Serial No. 119,149. (No model.)

*To all whom it may concern:*

Be it known that I, NATHANIEL LOMBARD, a citizen of the United States of America, and a resident of Brookline, in the county of Norfolk and State of Massachusetts, have invented certain new and useful Improvements in Governors, of which the following is a specification.

My invention relates to mechanism for controlling the speed of various motors, and more particularly to such governors which serve to apply power from an auxiliary source to effect the movements of the valve, gate, or other regulating device.

The invention consists in the novel features and combinations hereinafter described and claimed.

Figure 1:
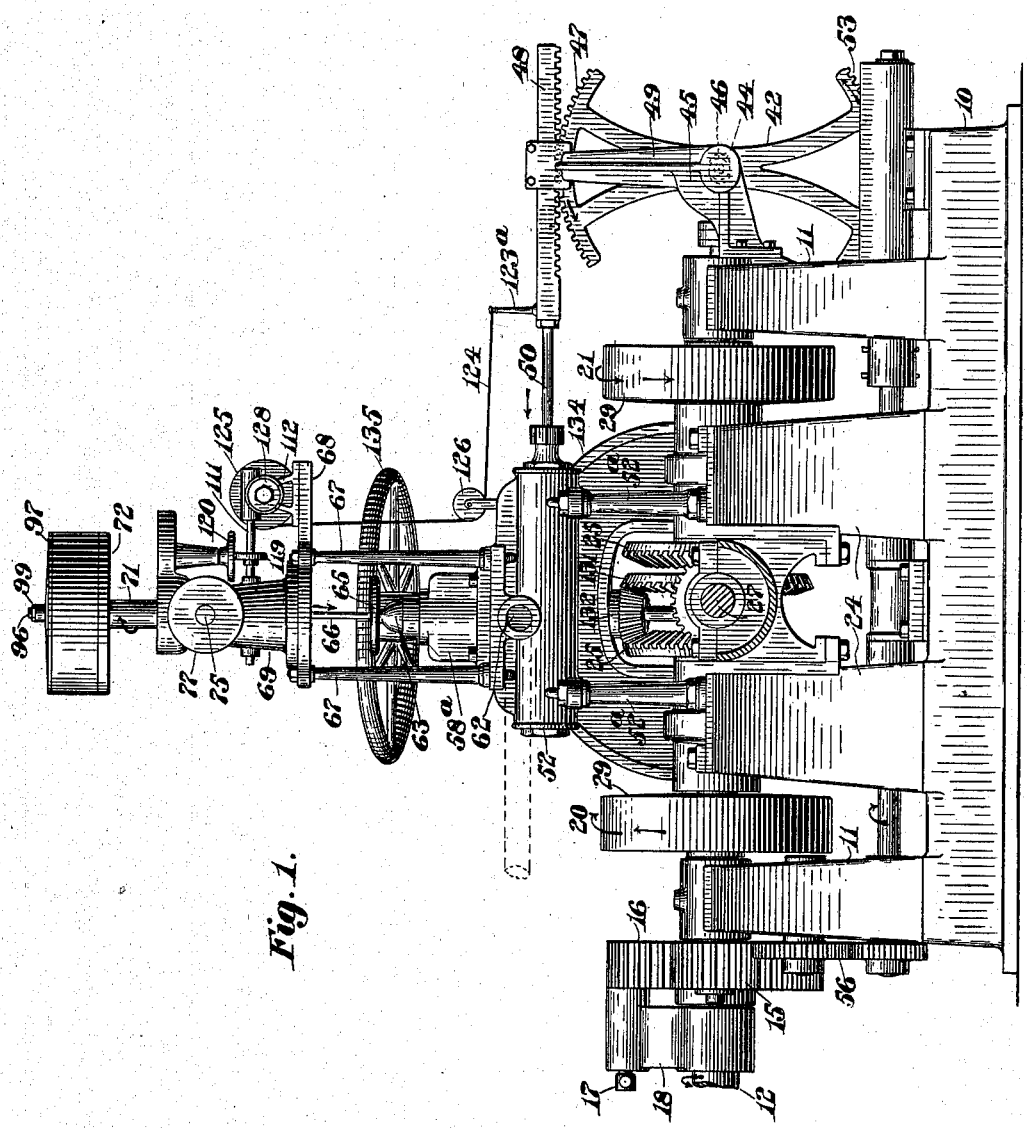
Figure 2:
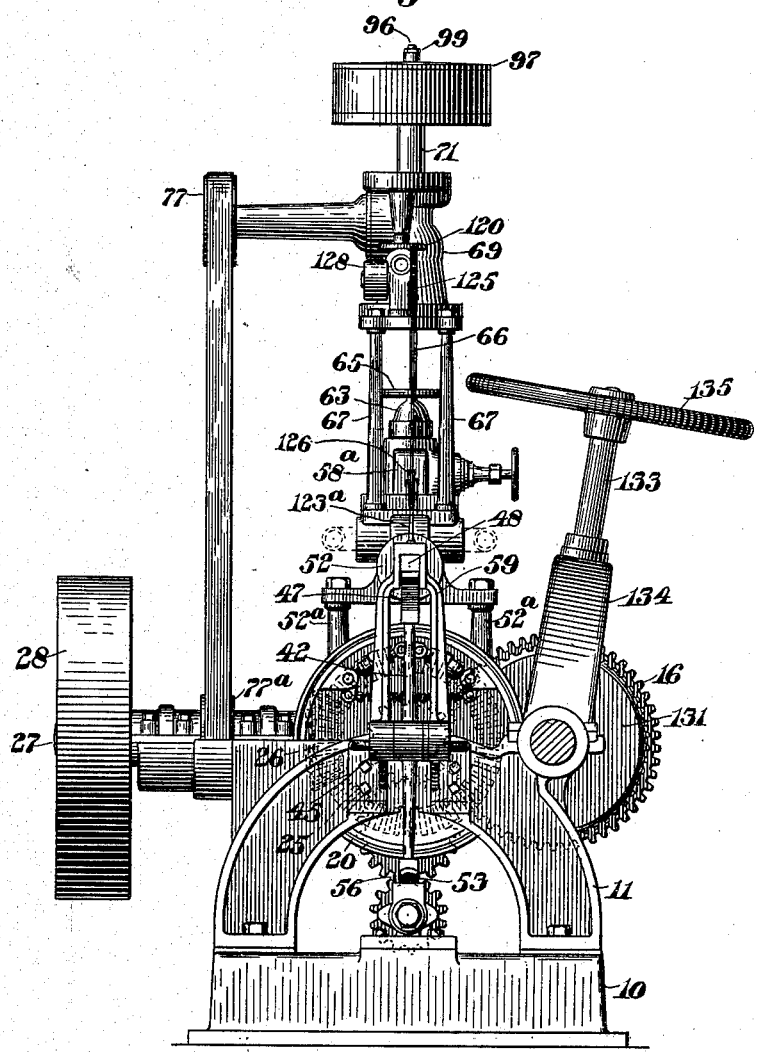
Figure 3:
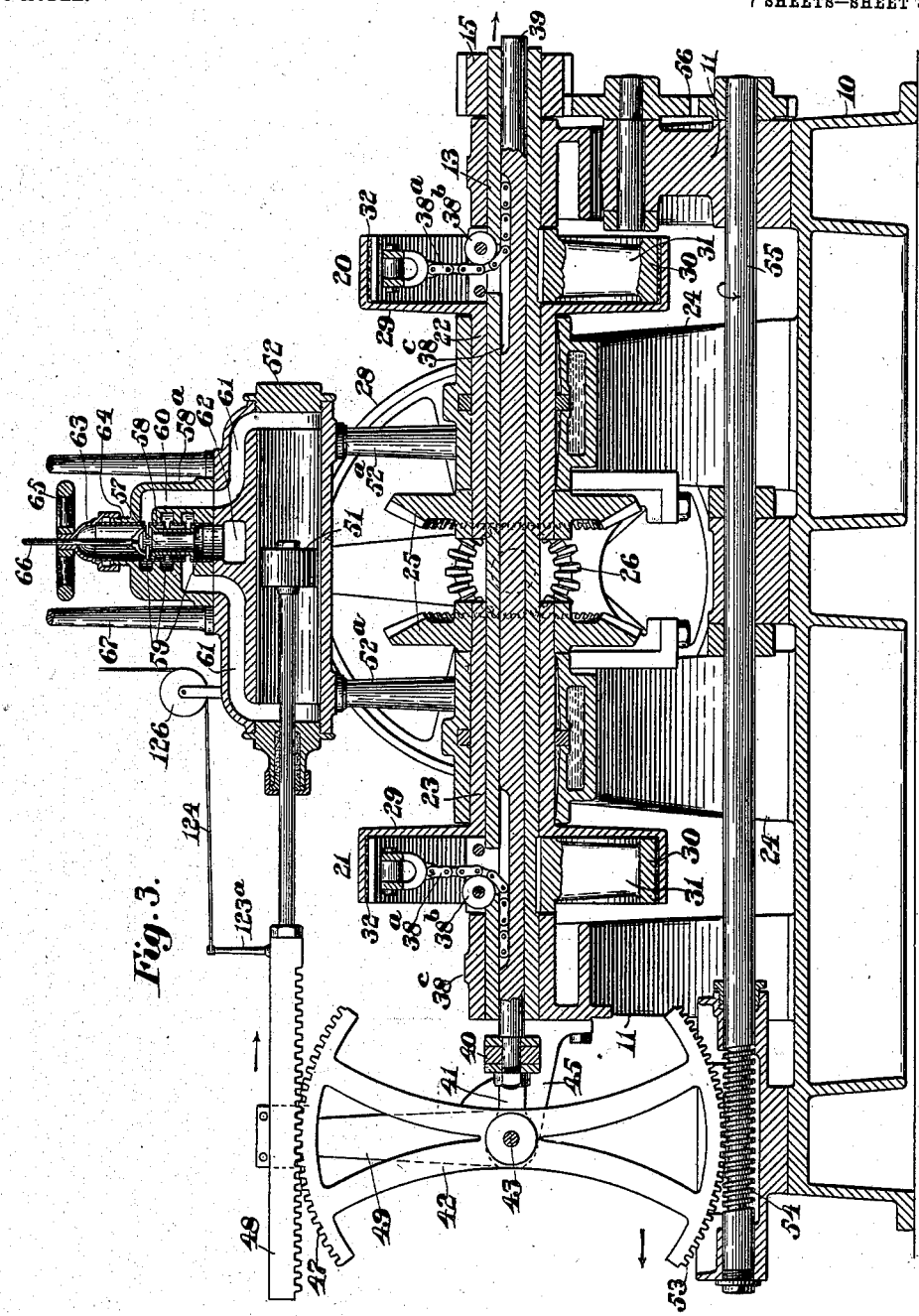
Figure 4:
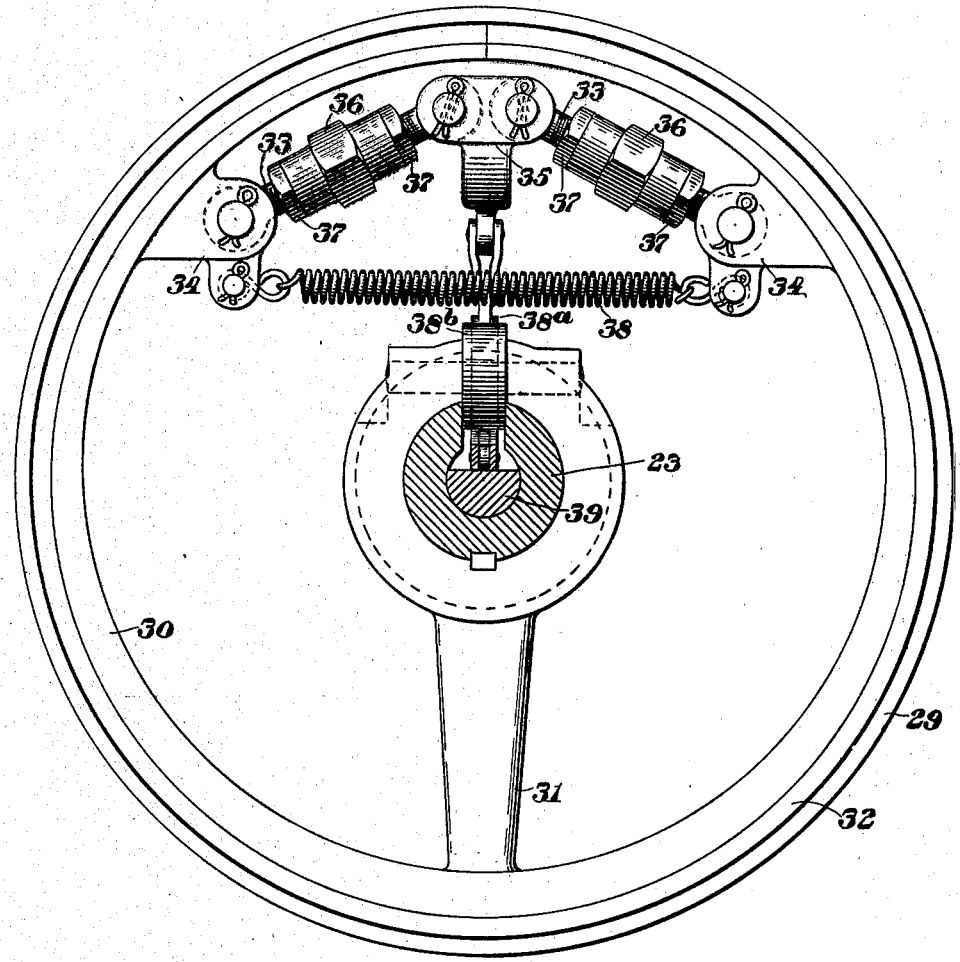
Figure 5:
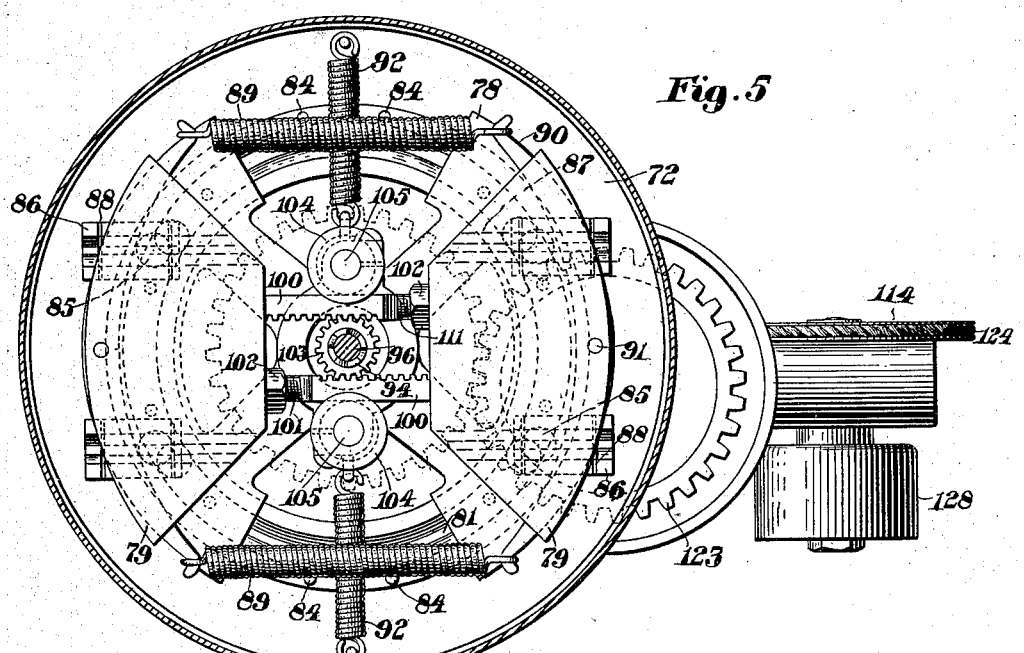
Figure 11:
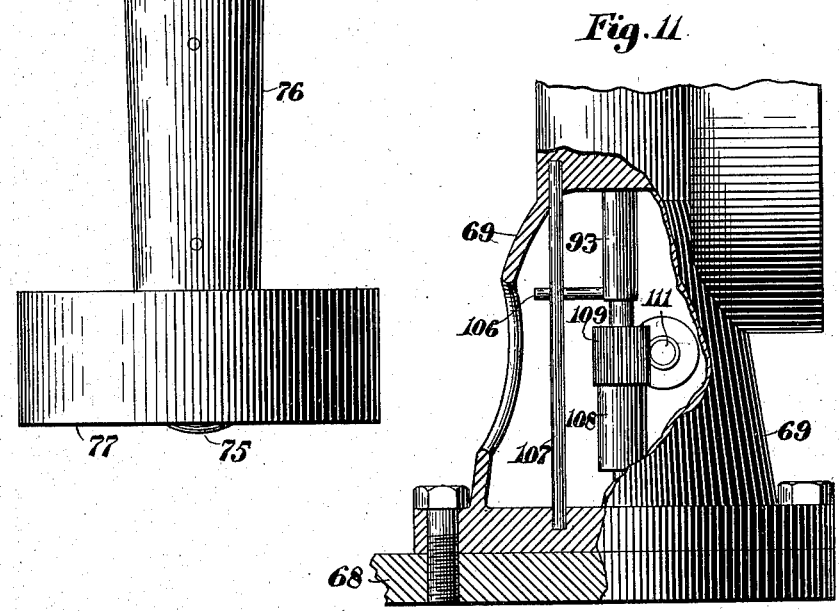

In the accompanying drawings, Figure 1 is a rear elevation of one embodiment of my invention with the portion of the driving mechanism removed. Fig. 2 is an end elevation thereof. Fig. 3 is a central vertical longitudinal section. Fig. 4 is an enlarged detail, in side elevation, of one of the clutches. Fig. 5 is a top plan view of the upper portion of the governor with the casing for the centrifugal mechanism and the screw supported thereby in section. Fig. 6 is an irregular longitudinal vertical section thereof. Fig. 7 is a front elevation of the centrifugal mechanism with the casing and flange on which it is supported in section. Fig. 8 is a detail in side elevation of a portion of the actuating mechanism for the valve-rod with the head of its spring-inclosing casing removed. Fig. 9 is a vertical transverse section thereof; and Figs. 10 and 11 are a broken and front side elevation, respectively, of the device for preventing the rotation of the valve-rod.

Similar characters indicate like parts throughout the several figures of the drawings.

The numeral 10 designates a suitable baseplate, on which is journaled in standards 11 a shaft 12 for connection with the gate or regulating device for controlling the speed of a motor—as, for example, a turbine-wheel—which shaft may be appropriately termed a "motor-controlling shaft." In the standards 11 may be also journaled a preferably hollow actuating-shaft 13 for the motor-controlling shaft, they being conveniently connected by spur-gears 15 16, the latter preferably releasably fixed to the shaft 12 by some such connector as a pin-clutch 17, carried by an arm 18, fast upon the shaft and engaging an opening in the gear. The actuating-shaft has fast upon it the inner members of clutches or connectors 20 21, the outer members of which are fixed to or formed integrally with driving-shafts 22 23, respectively, which are here shown as hollow, surrounding the actuating-shaft and journaled in the standards 24, supported upon the base-plate between the standards 11. The driving-shafts may be conveniently rotated in opposite directions by bevel-gears 25, meshing with a bevel-gear 26, fixed to a shaft 27, conveniently journaled in one of the standards and rotated at the desired speed from any suitable source of power through a pulley 28. The outer member of each clutch may consist of a flanged disk 29, while the inner coacting member is preferably formed as a divided ring 30, carried by an arm 31, having its hub keyed to the actuating-shaft. A leather facing 32 is shown as secured to the outer surface of the ring 30. This ring may be expanded to frictionally coact with the outer member by a toggle-lever having the arms 33 33, pivoted to lugs 34, projecting from the opposite sides of the ring and to an intermediate block 35. The arms may be made adjustable in length by including a right and left hand coupling 36, into which they are threaded, check-nuts 37 at each end serving to maintain the adjustment. If desired, a spring 38 may be provided extending between the sections of the ring to hold it normally out of contact with the outer member. To each block 35 is connected a chain or flexible member 38ª, conveniently passing over a guide-roll 38ᵇ, turning on a pin fixed to the actuating-shaft and into a recess 38ᶜ in an operating rod or member 39 for the clutches located within the actuating-shaft, these chains extending from the clutches in opposite directions.

One end of the operating-rod is connected by a swivel 40 and a yoke 41 to a lever 42 through oppositely-projecting stub-shafts 43 thereon. These shafts also furnish a support for the lever, which permits it to turn and also to have a movement of translation by bearing in elongated recesses 44 in arms 45, projecting from one of the standards 11, rollers 46 being preferably provided upon the shafts to run in the grooves. To actuate the lever and move the operating-rod in one direction or another to operate either of the clutches, as may be necessary to impart the desired regulating movement, one end of the lever, here shown as the upper end, is provided with a set of teeth 47, forming a segmental spur-gear. With this segment meshes a rack 48, conveniently guided by an upright 49 and connected with the rod 50 of a piston 51, operating in a power-cylinder 52, shown as supported by posts or uprights 52ª from the standards 24. To either end of this cylinder hydraulic or other pressure may be admitted by controlling mechanism to be later described. The opposite end of the lever from that coöperating with the rack 48 is provided with teeth 53, here shown as forming a segment of a worm-wheel and meshing with a worm 54 upon a shaft 55, suitably journaled upon the base-plate. This shaft either remains stationary or is rotated in one direction or the other, depending upon the condition of the clutches 20 21, by gearing 56, connecting it with the actuating-shaft, the parts being so related that the movement it imparts to the lever will be in the opposite direction from that caused by the rack.

To control the admission of power to the cylinder, a valve, preferably comprising a hollow body 57, reciprocating within a casing 58, supported in a chest 58ª, is provided. Both body and casing have a series of openings 59, suitably arranged to admit the fluid-pressure supplied through a passage 60 in the chest to either one of two passages 61 61 at either end of the cylinder, and at the same time permit exhaust from the opposite end through a passage 62. To enable the valve to be adjusted, its casing may be closed at the top by a cap or dome 63, threaded upon the chest at 64. A hand-wheel 65, secured to the cap, allows the casing to be readily turned, and thus raise and lower the openings and change their relation to those of the inner body. To the valve-body is fixed a rod 66, extending up through the cap 63 and connected with centrifugal governing mechanism to be now described.

From convenient points, as from the top of the cylinder, rise posts or uprights 67, carrying a suitable plate 68, upon which is supported a standard 69, having stepped in it a hollow shaft 70. Fastened upon the shaft, preferably by a thread 71ª at its upper end, is a sleeve or hollow shaft 71, here shown as integral with a disk or platform 72, serving as a primary support for the governor members to be hereinafter described. The sleeve may have upon it a bevel-pinion 73, meshing with a bevel-gear 74 upon a shaft 75. This shaft is journaled in a bearing 76 in the standard 69, and continuously rotated at the desired speed through a pulley 77, conveniently belted to a pulley 77ª on the shaft 27.

The platform 72 preferably carries a secondary support or platform 78 for centrifugal members or weights 79, these weights being conveniently two in number of sector shape, and the platform 78 may be of similar shape, being only of sufficient extent to furnish the proper support. As here illustrated this secondary support is mounted for independent rotation upon the platform 72 by means of balls or other antifriction members 80 moving in circular ways 81 82 in the primary and secondary supports, respectively. Contact-pins 83 are fixed in the ways 81 to limit the movement of the balls therein, while pins 84 act as stops for the support 78. The weights are mounted for radial movement upon balls 85, rolling in pairs of ways 86 87, provided in any convenient manner in the support 78 and weights, respectively, and retained against displacement by contact-pieces 88.

To oppose centrifugal force and hold the weights at the limit of inward movement when the primary support is stationary. springs 89 are provided, here shown as two in number, of spiral form and extending between the weights on each side. To compensate for differences in tension and permit the weights to run smoothly without cramping or throwing uneven pressure upon the balls, these springs are connected to the opposite ends of yokes 90, pivoted at 91 upon each weight. The secondary support is yieldably connected with the primary support to resist the movement of the former, for a purpose to be later explained, by springs 92, in the present instance shown as spiral tension-springs, fixed at their ends and extending radially between the two supports.

In alinement with the valve-rod 66, forming an extension thereof, is a controlling-rod 93, preferably extending through the hollow shaft 70 and supported at or near its upper end by an internally-threaded sleeve or member 94, swiveled to the rod at 95, the thread of which sleeve coacts with a screw 96, fixed with regard thereto. A convenient means of supporting the screw 96 is upon an inclosing casing 97, secured to the primary support, it extending therethrough and being held against longitudinal movement by a collar 98 abutting against the under side of the top of the casing, and a nut 99, threaded upon the shank of the screw on the upper side. The setting of this nut also holds the screw from rotation in the casing, but when loosened permits a rotary adjustment to raise or lower the rod 93 thereon. The weights are geared to the sleeve 94 preferably by racks 100, shown as adjustably mounted upon the weights by the shanks 101, threaded into the openings therein and held in place by check-nuts 102. These racks mesh with teeth 103, forming an elongated pinion upon the exterior of the sleeve, and since the racks are on opposite sides the opposite movement of the weights toward or from one another acts to rotate the sleeve in one direction. Rolls 104, preferably turning on studs 105, carried by the secondary support, coact with the back of the racks to retain them in proper relation to the sleeve. Rotation of the rod 93 under the influence of the rotation of the sleeve may be prevented by a pin 106, extending from the rod between a pair of guide-pins 107, fixed in the standard 69.

The controlling-rod 93 is shown as connected with the valve-rod 66 by an internally-threaded sleeve 108, fixed to or integral with the latter and coacting with a threaded end 109, formed with or secured to the rod 93. The exterior of the sleeve 108 is provided with gear-teeth 109, forming an elongated pinion meshing with rack-teeth 110, preferably of circular form or extending entirely around a shaft 111, journaled both for rotation and reciprocation conveniently in the standard 69. Upon the plate 68 may be secured a small standard 112, in which is journaled a shaft 113, having fast upon it a drum or pulley 114 and a pinion 115. In a bore adjacent to this pinion slides a sleeve 116, having at one side a rack 117, meshing with the pinion. The sleeve is internally threaded to receive a thread 118 upon one end of the shaft 111. This shaft also has secured to it a roll 119, having its outwardly-curved face contacting with a disk or member 120, which may, if desired, be provided with a renewable surface of leather or other suitable material 121. The disk 120 is carried by a shaft 122, conveniently journaled in a bearing formed in the standard 69 and continuously rotated during the revolution of the weights by gearing 123 to the sleeve 71. The pulley 114 may be rotated in one direction by connection with some reciprocating element, preferably of the governor, as a post 123ª, moving, with the piston-rod 50, through a flexible member or cord 124, fastened at 125 in a groove in the pulley and extending over a guide-roll 126. Opposite movement of the shaft 113 may be secured by a coil-spring 127, conveniently located within a casing 128, carried by the standard 112 and pinned at 129 and 130 to the casing and shaft, respectively. The rotation of the shaft by the cord acts to wind up or put tension upon the spring, which upon the slackening of the cord serves to impart a reverse rotation to the shaft.

The operation of my improved governor is as follows: With the parts in the relation here illustrated power is applied to the pulley 28 to drive the centrifugal mechanism left-handedly at such a rate that normally for the desired speed of rotation of the motor the weights are substantially at the center of their range of movement, and the various screws, racks, and the roll 60 will also be at the center of their path. This condition continues until there is a change in the speed of the motor—as, for example, an increase. This results in the primary support 72 rotating more rapidly, causing the weights to move outwardly upon the secondary support under the increased centrifugal force generated, and their racks, moving by the sleeve 37, rotate it so that it moves down the screw 39. This lowers the valve 57, admitting pressure to the right-hand end of the cylinder. (See Figs. 1 and 6, where the movements of the various elements are indicated by arrows.) The travel of the rack 48 as a result thereof moves the coacting end of the lever 42 to the left or inwardly about its lower end as a fulcrum, the shaft 55 being for the time stationary and the segment rocking on the worm. This movement of the lever carries the operating-rod 39 to the left, sets the clutch 20, and compels the actuating-shaft to rotate with the driving-shaft 22 right-handedly, turning the shaft 12 in such a direction as to close the gate if, for example, a hydraulic system is being governed; but before the above-mentioned movement of the weights occurs the secondary support, lagging behind the primary support upon the increase of speed, because of its inertia, produces a very quick movement of rotation between the weights and screw 96, the secondary support turning against the tension of the springs 92. This results in a movement of the controlling-rod in the same direction as that secured by an outward travel of the weights, but more promptly, thus effecting an immediate partial correction by the governor, which is continued more gradually by the mechanism previously described until the desired movement is attained. If the weights acted alone upon the controlling mechanism, they would tend to cause too great a movement or to over-correct. To obviate this difficulty and check the piston, the pulley 114 is rotated by its spring, so that the shaft 111 is moved by the pinion and rack to the left. This rotates the sleeve 108 and causes it to ascend the thread 109, so that the valve-rod as a whole is shortened, this continuing until the valve is restored to its initial position, at which the pressure is shut off both ends of the cylinder. To counteract the effect of the power-cylinder upon the clutch to permit the return of the valve to its normal position and the consequent checking of the piston to stop the movement of the gate, a compound movement of translation is automatically imparted to the lever 42 in the following manner: As soon as the actuating-shaft begins its rotation through the connection made by the clutch 20 it also rotates the shaft 55 right-handedly through the gearing 56. This causes the worm to move the lower portion of the lever to the right upon the rack-teeth as a fulcrum, and this being in the opposite direction to the travel of the rack tends to release the clutch. As long as the piston continues its movement the rate of travel of the upper end of the lever will exceed that of the lower and the clutch will remain in engagement; but as soon as the piston is checked by the return of the valve to its normal position this outward movement of the lever disengages the clutch and the movement of the gate at once ceases until the valve again acts.

As the above operations will restore the motor system to its normal speed, the weights will return to the position they occupied before the change occurred, and unless their effect upon the valve-rod is neutralized they would move it in the opposite direction and destroy the balance of forces just attained. The mechanism actuated by the roll 119 prevents this. While the weights occupy their normal position the roll will be at the center of the disk 120 and will remain at rest; but as soon as the shaft moves longitudinally in acting to shorten the valve-rod it carries the roll off the center to a point having rotary travel. This rotates the roll and the shaft, and the thread of the latter turning in the sleeve 116 moves the shaft to the right until the roll again reaches the axis of the disk, causing the sleeve 108 to be lowered upon the screw 109 and moving the valve downward an amount equal to that which it is moved upward by the return of the weights. It will be evident that the farther the weights depart from the normal the farther the roll will be carried from the center of the disk and the more rapidly the shaft be rotated, and therefore the neutralizing of the return of the weights will be at a rate varying with the extent of their movement and the distance which the shaft has been moved, being at first most rapid, then gradually decreasing as the roll returns to the center. The neutralizing effect will, moreover, be substantially proportional to the rate of return of the weights to the normal.

The action of my improved governor will be to secure extremely rapid or prompt corrections for changes of speed of the motor governed, arising from changes of load and the like, without permitting this correction to overrun and produce a seesawing of the speed in opposite directions, thus securing an almost absolutely constant rotation of the motor and system driven thereby, while applying at all times ample power to overcome any resistance to movement of the gate or other regulating mechanism.

As it may be desired at times to operate the regulating mechanism by hand, the shaft 12 may carry fast upon it a bevel-gear 131, meshing with a bevel-pinion 132 upon a spindle 133, turning in a support 134 and provided with a hand-wheel 135. When this hand mechanism is in use, the pin-clutch 17 may be drawn out of the gear to disconnect the governor from the motor-controlling shaft.

It will be seen that apart from the consideration of convenience in disconnecting and in general arrangement the shaft 12 might be entirely omitted and the shaft 13 more or less directly connected to the gate or other device for controlling the motor, in which case said shaft 13 would become an actuating-shaft for the gate instead of for the motor-controlling shaft.

Having thus described my invention, I claim—

1. In a governor, the combination with a hollow actuating-shaft, of means for rotating the actuating-shaft in opposite directions, connectors between the rotating means and actuating-shaft located in part within said actuating-shaft, power mechanism acting upon the connectors, and means for controlling the application of power.

2. In a governor, the combination with a motor-controlling shaft, of a hollow actuating-shaft therefor, means for rotating the actuating-shaft in opposite directions, connectors between the rotating means and actuating-shaft located in part within said actuating-shaft, power mechanism acting upon the connectors, and means for controlling the application of power.

3. In a governor, the combination with a hollow actuating-shaft, of means for rotating the actuating-shaft in opposite directions, connectors between the rotating means and actuating-shaft located in part within said actuating-shaft, a power-cylinder acting upon the connectors, and a valve controlling the admission of pressure to the cylinder.

4. In a governor, the combination with an actuating-shaft, of two oppositely-rotating driving-shafts, pairs of coacting clutch members one member of each pair being secured to the actuating-shaft and the other to a driving-shaft, a power-cylinder acting upon one of the clutch members of each pair, and a valve controlling the admission of pressure to the cylinder.

5. In a governor, the combination with a motor-controlling shaft, of a hollow actuating-shaft therefor, two oppositely-rotating driving-shafts, pairs of coacting clutch members carried by the actuating-shaft and driving-shafts, and an operating member for the clutches movable within the actuating-shaft.

6. In a governor, the combination with a hollow actuating-shaft, of two oppositely-rotating driving-shafts, pairs of coacting clutch members carried by the actuating-shaft and driving-shafts, an operating member for the clutches movable within the actuating-shaft, a power-cylinder acting upon the operating member, and a valve controlling the admission of pressure to the cylinder.

7. In a governor, the combination with a hollow actuating-shaft, of two oppositely-rotating driving-shafts, pairs of coacting clutch members carried by the actuating-shaft and driving-shafts, a rod movable within the actuating-shaft, and flexible members connecting the rod and one of each pair of clutch members.

8. In a governor, the combination with a motor-controlling shaft, of a hollow actuating-shaft therefor, two oppositely-rotating driving-shafts, pairs of coacting clutch members carried by the actuating-shaft and driving-shafts, a rod provided with a recess movable within the actuating-shaft, and chains secured within the recess and to one of each pair of clutch members.

9. In a governor, the combination with an actuating-shaft, of two oppositely-rotating driving-shafts, an outer clutch member fast upon each driving-shaft, a pair of arms fast upon the actuating-shaft, a divided ring carried by each arm within the outer clutch member, means for expanding the ring, power mechanism acting upon the expanding means, and means for controlling the application of power.

10. In a governor, the combination with an actuating-shaft, of two oppositely-rotating driving-shafts, an outer clutch member fast upon each driving-shaft, a pair of arms fast upon the actuating-shaft, a divided ring carried by each arm within the outer clutch member, a toggle-lever connecting the parts of the ring, a flexible member connected with the toggle-lever, a power-cylinder connected with the flexible member, and a valve controlling the admission of pressure to the cylinder.

11. In a governor, the combination with an actuating-shaft, of two oppositely-rotating driving-shafts, an outer clutch member fast upon each driving-shaft, a pair of arms fast upon the actuating-shaft, a divided ring carried by each arm within the outer clutch member, a toggle-lever connecting the parts of the ring, means for adjusting the length of the toggle-lever, a flexible member connected with the toggle-lever, a power-cylinder connected with the flexible member, and a valve controlling the admission of pressure to the cylinder.

12. In a governor, the combination with a motor-controlling shaft, of a hollow actuating-shaft therefor, two oppositely-rotating driving-shafts, an outer clutch member fast upon each driving-shaft, a pair of arms fast upon the actuating-shaft, a divided ring carried by each arm within the outer clutch member, a toggle-lever connecting the parts of the ring, an operating member for the clutches movable within the actuating-shaft, and a chain connected with each toggle-lever and the operating means.

13. In a governor, the combination with a hollow actuating-shaft, of means for rotating the actuating-shaft in opposite directions, connectors between the rotating means and actuating-shaft located in part within said actuating-shaft, power mechanism acting upon the connectors to cause the rotation of the actuating-shaft in one direction or the other, and automatic means for counteracting the effect of the power mechanism upon the connectors.

14. In a governor, the combination with a hollow actuating-shaft, of means for rotating the actuating-shaft in opposite directions, connectors between the rotating means and actuating-shaft located in part within said actuating-shaft, power mechanism acting upon the connectors to cause the rotation of the actuating-shaft in one direction or the other, and means operable from the actuating-shaft for counteracting the effect of the cylinder upon the connectors.

15. In a governor, the combination with a hollow actuating-shaft, of two oppositely-rotating driving-shafts, pairs of coacting clutch members one member of each pair being secured to the actuating-shaft and the other member to a driving-shaft, a power-cylinder acting to effect the engagement of the clutches, and means for disengaging the clutches independently of the power-cylinder.

16. In a governor, the combination with a hollow actuating-shaft therefor, of two oppositely-rotating driving-shafts, pairs of coacting clutch members carried by the actuating-shaft and driving-shafts, an operating member for the clutches movable within the actuating-shaft, a power-cylinder acting to move the operating member in one direction, and means independent of the power-cylinder for moving the operating member in the other direction.

17. In a governor, the combination with an actuating-shaft, of two oppositely-rotating driving-shafts, clutches connecting the driving-shafts and actuating-shaft, a lever connected with the clutches at a point intermediate its ends, power mechanism acting upon one end of the lever, and mechanism connected with the actuating-shaft for moving the other end of the lever.

18. In a governor, the combination with an actuating-shaft, of two oppositely-rotating driving-shafts, clutches connected with the driving-shafts and actuating-shaft, a lever connected with the clutches at a point intermediate its ends, power mechanism acting upon one end of the lever to effect the engagement of the clutches, and mechanism connected with the actuating-shaft for automatically moving the other end of the lever to disengage the clutches.

19. In a governor, the combination with an actuating-shaft, of two oppositely-rotating driving-shafts, clutches connecting the driving-shafts and actuating-shaft, a lever connected with the clutches at a point intermediate its end and provided at each end with gear-teeth, a rack meshing with one set of gear-teeth, a power-cylinder for operating the rack, a worm meshing with the other set of teeth, and gearing for rotating the worm from the actuating-shaft.

20. In a governor, the combination with a hollow actuating-shaft, of two oppositely-rotating driving-shafts surrounding the actuating-shaft, an outer clutch member fast upon each driving-shaft, coacting inner clutch members fast upon the actuating-shaft, a rod within the actuating-shaft connected with the inner clutch members, a lever connected with the rod, and means for applying power to the opposite ends of the lever.

21. In a governor, the combination with a hollow actuating-shaft, of two oppositely-rotating driving-shafts surrounding the actuating-shaft, an outer clutch member fast upon each driving-shaft, coacting inner clutch members fast upon the actuating-shaft, a rod within the actuating-shaft, chains connecting the rods and inner clutch members and lever, a swivel connecting the rod with the lever intermediate its ends, and means for applying power to the lever.

22. In a governor, the combination with a hollow actuating-shaft, of two oppositely-rotating driving-shafts surrounding the actuating-shaft, an outer clutch member fast upon each driving-shaft, coacting inner clutch members fast upon the actuating-shaft, a rod within the actuating-shaft connected with the inner clutch members, a lever having projections intermediate its ends, a bearing into which the projections extend permitting a bodily movement of the lever, a connector between the rod and lever projections, and means for applying power to both ends of the lever.

23. In a governor, the combination with a hollow actuating-shaft, of means for rotating the actuating-shaft in opposite directions, connectors between the rotating means and actuating-shaft located in part within said actuating-shaft, power mechanism acting upon the connectors, means for controlling the application of power, and a centrifugal mechanism for actuating the controlling means.

24. In a governor, the combination with an actuating-shaft, of means for rotating the actuating-shaft in opposite directions, connectors between the rotating means and actuating-shaft, power mechanism acting upon the connectors, means for controlling the application of power, a primary weight-support rotatable from the motor, a secondary weight-support mounted to turn on the primary support and yieldably connected therewith, a centrifugal weight carried by the secondary support, and a connector between the weights and controlling means.

25. In a governor, the combination with an actuating-shaft, of means for rotating the actuating-shaft in opposite directions, connectors between the rotating means and actuating-shaft, power mechanism acting upon the connectors, means for controlling the application of power, a primary weight-support rotatable from the motor, a secondary weight-support mounted to turn on the primary support, and springs extending between the primary support and secondary support.

26. In a governor, the combination with an actuating-shaft, of means for rotating the actuating-shaft in opposite directions, connectors between the rotating means and actuating-shaft, power mechanism acting upon the connectors, means for controlling the application of power, a centrifugal weight rotatable from the motor, a rack mounted upon the weight, and a gear carried by the controlling means and meshing with the rack.

27. In a governor, the combination with an actuating-shaft, of means for rotating the actuating-shaft in opposite directions, connectors between the rotating means and actuating-shaft, power mechanism acting upon the connectors, means for controlling the application of power, a centrifugal weight rotatable from the motor, a rack mounted upon the weight, a sleeve carried by the controlling means provided with an internal thread and with external teeth meshing with the rack, and a threaded member with which the thread of the sleeve coacts.

28. In a governor, the combination with an actuating-shaft, of means for rotating the actuating-shaft in opposite directions, connectors between the rotating means and actuating-shaft, power mechanism acting upon the connectors, means for controlling the application of power, a rotatable casing, a screw fixed to the casing, a centrifugal weight movable in the casing, a rod connected with the controlling means, and a threaded member swiveled to the rod coöperating with the screw and geared to the weight.

29. In a governor, the combination with an actuating-shaft, of means for rotating the actuating-shaft in opposite directions, connectors between the rotating means and actuating-shaft, power mechanism acting upon the connectors, means for controlling the application of power, a rotatable casing, a screw fixed to the casing, a centrifugal weight movable in the casing, a rod connected with the controlling means, a threaded member swiveled to the rod coöperating with the screw and geared to the weight, and means for adjusting the screw in the casing to vary the position of the threaded member thereon.

30. In a governor, the combination with an actuating-shaft, of means for rotating the actuating-shaft in opposite directions, connectors between the rotating means and actuating-shaft, power mechanism acting upon the connectors, means for controlling the application of power, a rotatable casing, a screw fixed to the casing, a weight movable in the casing, means for permitting the weight to lag behind the casing when changes in its speed of rotation occur, a controlling-rod, and a threaded member swiveled to the rod, said threaded member coöperating with the screw and geared to the weight.

31. In a governor, the combination with an actuating-shaft, of means for rotating the actuating-shaft in opposite directions, connectors between the rotating means and actuating-shaft, power mechanism acting upon the connectors, means for controlling the application of power, a horizontal platform rotatable from the motor and provided with ways, balls in the ways, a centrifugal weight supported by the balls, and a connector between the weight and controlling means.

32. In a governor, the combination with a hollow actuating-shaft, of means for rotating the actuating-shaft in opposite directions, connectors between the rotating means and actuating-shaft located in part within said actuating-shaft, power mechanism acting upon the connectors, means for controlling the application of power, centrifugal mechanism for actuating the controlling means, and mechanism for counteracting the effect of the centrifugal mechanism upon the valve.

33. In a governor, the combination with a hollow actuating-shaft, of means for rotating the actuating-shaft in opposite directions, connectors between the rotating means and actuating-shaft located in part within said actuating-shaft, a power-cylinder acting upon the connectors, and a valve controlling the admission of pressure to the cylinder, centrifugal mechanism for actuating the valve, and mechanism operated by the element moved by the power-cylinder for counteracting the effect of the centrifugal mechanism upon the valve.

34. In a governor, the combination with a hollow actuating-shaft, of means for rotating the actuating-shaft in opposite directions, connectors between the rotating means and actuating-shaft located in part within said actuating-shaft, power mechanism acting upon the connectors, means for controlling the application of power, centrifugal weights for actuating the controlling means upon their departure from the normal position, and means for neutralizing the effect of the weights in their return to the normal.

35. In a governor, the combination with an actuating-shaft, of means for rotating the actuating-shaft in opposite directions, connectors between the rotating means and actuating-shaft, a power-cylinder acting upon the connectors, a valve controlling the admission of fluid-pressure to the cylinder, revoluble weights operating upon the valve-rod, a threaded sleeve carried by said valve-rod, a shaft at right angles to the valve-rod and coöperating with the sleeve, means for moving the shaft to rotate the sleeve, and means for returning the shaft to its normal position at a speed varying with the distance to which it has been moved.

36. In a governor, the combination with an actuating-shaft, of means for rotating the actuating-shaft in opposite directions, connectors between the rotating means and actuating-shaft, power mechanism acting upon the connectors, means for controlling the application of power, revoluble weights operating upon the valve-rod, a threaded sleeve carried by said valve-rod, a shaft at right angles to the valve-rod and coöperating with the sleeve, means for moving the shaft longitudinally to rotate the sleeve, a roll carried by the shaft, and a continuously-rotatable member with which the roll contacts.

37. In a governor, the combination with a hollow actuating-shaft, of means for rotating the actuating-shaft in opposite directions, connectors between the rotating means and actuating-shaft located in part within the actuating-shaft, a power-cylinder acting upon the connectors, a valve controlling the admission of fluid-pressure to the cylinder, revoluble weights operating upon the valve-rod, a threaded sleeve carried by said valve-rod, a shaft coöperating with the sleeve, means for moving the shaft to rotate the sleeve, and means for returning the shaft to its normal position at a speed varying with the distance to which it has been moved.

38. In a governor, the combination with a hollow actuating-shaft, of means for rotating the actuating-shaft in opposite directions, connectors betweeen the rotating means and actuating-shaft located in part within the actuating-shaft, power mechanism acting upon the connectors, means for controlling the application of power, revoluble weights operating upon the valve-rod, a threaded sleeve carried by said valve-rod, a shaft coöperating with the sleeve, means for moving the shaft longitudinally to rotate the sleeve, a roll carried by the shaft, and a continuously-rotatable member with which the roll contacts.

Signed by me at Boston, Massachusetts, this 8th day of August, 1902.

NATHANIEL LOMBARD.

Witnesses:
 WALTER E. LOMBARD,
 WILLIAM B. WOLFENDALE.